United States Patent [19]

Mizuno et al.

[11] Patent Number: 5,212,256
[45] Date of Patent: May 18, 1993

[54] THERMOPLASTIC RESIN COMPOSITION

[75] Inventors: Yukio Mizuno; Takashi Maruyama; Hiroomi Abe, all of Chiba; Yutaka Terada, Hyogo, all of Japan

[73] Assignee: Sumitomo Chemical Co., Ltd., Osaka, Japan

[21] Appl. No.: 610,205

[22] Filed: Nov. 8, 1990

Related U.S. Application Data

[63] Continuation-in-part of Ser. No. 352,996, May 17, 1989, abandoned.

[30] Foreign Application Priority Data

May 24, 1988 [JP] Japan .................. 63-127391

[51] Int. Cl.$^5$ .................. C08L 71/12; C08L 75/00; C08L 77/00
[52] U.S. Cl. .................. 525/395; 525/68; 525/390; 525/397; 525/905
[58] Field of Search .......... 525/138, 397, 905, 395, 525/390

[56] References Cited

U.S. PATENT DOCUMENTS

| | | | |
|---|---|---|---|
| 4,198,492 | 4/1980 | Izawa et al. | 525/134 |
| 4,315,086 | 2/1982 | Ueno et al. | |

FOREIGN PATENT DOCUMENTS

| | | | |
|---|---|---|---|
| 24120 | 2/1981 | European Pat. Off. | |
| 129825 | 1/1985 | European Pat. Off. | |
| 56-47432 | 4/1981 | Japan | |
| 57-10642 | 1/1982 | Japan | |
| 60-11966 | 3/1985 | Japan | |
| 60-58463 | 4/1985 | Japan | |
| 61-204263 | 9/1986 | Japan | |
| 62-236853 | 10/1987 | Japan | 525/134 |

OTHER PUBLICATIONS

WPIL, File Supplier, abstract No. AN-84-071081, Derwent Publications Ltd., London, GB; & JP-A-59 24 752 (Kanebo K.K.) Aug. 2, 1984.
WPIL, File Supplier, abstract No. AN-87-331349, Derwent Publications Ltd., London; GB; & JP-A-62 236 853 (Asahi Chemical Ind. K.K.) Sep. 4, 1986.

*Primary Examiner*—Jacob Ziegler
*Attorney, Agent, or Firm*—Cushman, Darby & Cushman

[57] ABSTRACT

The present invention provides a thermoplastic resin composition which is improved in compatibility between polyphenylene ether and polyamide and is excellent in processability and impact strength. This composition comprises:

(A) 100 parts by weight of a composition comprising 95-5% by weight of a polyphenylene ether obtained by oxidation polymerization of one or more of phenol compounds represented by the following formula:

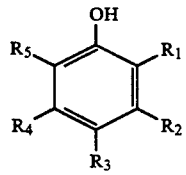

(wherein $R_1$, $R_2$, $R_3$, $R_4$ and $R_5$ which may be identical or different, each represents a hydrogen atom, a halogen atom, a hydrocarbon radical or a substituted hydrocarbon radical and at least one of them is a hydrogen atom) and 5-95% by weight of a polyamide, (B) 0-30 parts by weight of an impact strength modifier, and (C) 0.01-10 parts by weight of an amino resin obtained by modifying with an alcohol an addition reaction product of formaldehyde and at least one compound selected from the group consisting of melamine, guanamine and urea.

2 Claims, No Drawings

THERMOPLASTIC RESIN COMPOSITION

This is a continuation-in-part application of U.S. Ser. No. 07/352,996 filed May 17, 1989, now abandoned.

The present invention relates to a resin composition which comprises a polyphenylene ether and a polyamide.

More particularly, it relates to a novel thermoplastic resin composition which comprises a resin composition comprising a polyphenylene ether and a polyamide, to which are added an amino resin and, if necessary, an impact strength modifier. This thermoplastic resin composition is excellent in flow characteristics, mechanical properties and processability.

The composition of the present invention can be made into shaped articles, sheets or films by injection molding, extrusion molding, etc.

Generally, polyphenylene ether is a thermoplastic resin superior in various properties such as mechanical properties, heat resistance, electrical properties, chemical resistance, hot water resistance, flame resistance and dimension stability, but it is inferior in processability due to its high melt viscosity and is unsatisfactory in impact resistance.

In order to reduce melt viscosity of polyphenylene ether and improve its processability with retaining its superior properties, composites of polyphenylene ether and polystyrene have been proposed. In this case, although practical processability is imparted, the superior properties of polyphenylene ether per se such as heat resistance and flame resistance are still apt to be lost. In addition, impact resistance is not sufficient yet even in combination with polystyrene.

On the other hand, polyamide is a thermoplastic resin superior in heat resistance, stiffness, strength and oil resistance, However, polyamide is unsatisfactory in terms of processability and impact resistance, and is great in changes of properties and dimension in practical use due to its high water absorption. Thus, further improvements have been desired.

If a resin composition obtained by blending polyphenylene ether and polyamide retains the advantages of the two resins and is improved in processability and impact resistance, it can be expected to have a wide range of novel uses.

However, it has been considered that polyamide and polyphenylene ether are difficult to be compatible and dispersible with each other because they are greatly different in melt viscosity. In fact, if they are simply mixed, (1) it is nearly impossible to stably draw the extruded strands due to great difference in viscosity of their molten polymers and besides workability is very poor upon molding, and (2) mechanical properties, especially impact resistance of the molded product are lower than expected from the sum of impact resistances of respective resins and thus the molded products cannot be acceptable in practice.

In order to improve these points, use of additives which are reactive or compatible with the two resins has been proposed as disclosed in Japanese Patent Publication (Kokoku) No. 60-11966 and Japanese Patent Publication (Kokai) Nos. 56-47432, 57-10642 and 60-58463.

As a result of the inventors' intensive researches in an attempt to develop a technique effective to improve resin compositions comprising polyphenylene ether and polyamide, they have found that a resin composition excellent in both mechanical properties and processability can be obtained from polyphenylene ether and polyamide by adding thereto an amino resin and, if necessary, an impact strength modifier.

The present invention relates to a thermoplastic resin composition which comprises:

(A) 100 parts by weight of a composition comprising 95–5% by weight of a polyphenylene ether obtained by oxidation polymerization of at least one phenol compound represented by the following formula:

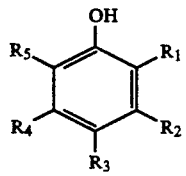

(wherein $R_1$, $R_2$, $R_3$, $R_4$ and $R_5$ which may be identical or different, each represents a hydrogen atom, a halogen atom, a hydrocarbon radical or a substituted hydrocarbon radical and at least one of them is a hydrogen atom) and 5–95% by weight of a polyamide, (B) 0–30 parts by weight of an impact strength modifier, and (C) 0.01–10 parts by weight of an amino resin obtained by modifying with an alcohol an addition reaction product of formaldehyde and at least one compound selected from melamine, guanamine and urea.

The polyphenylene ether (A) used in the present invention is a polymer obtained by oxidation polymerization of at least one phenol compound represented by the following formula:

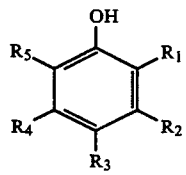

(wherein $R_1$, $R_2$, $R_3$, $R_4$ and $R_5$ which may be identical or different, each represents a hydrogen atom, a halogen atom, a hydrocarbon radical or a substituted hydrocarbon radical and at least one of them is a hydrogen atom) with oxygen or a gas containing oxygen using an oxidation coupling catalyst.

Examples of $R_1$, $R_2$, $R_3$, $R_4$ and $R_5$ in the above formula are hydrogen atom, chlorine atom, fluorine atom, bromine atom, iodine atom, methyl group, ethyl group, propyl group, butyl group, chloroethyl group, hydroxyethyl group, phenylethyl group, benzyl group, hydroxymethyl group carboxyethyl group, methoxycarbonylethyl group, cyanoethyl group, phenyl group, chlorophenyl group, methylphenyl group, dimethylphenyl group and ethylphenyl group.

Examples of the phenol compound as shown in the above formula are phenol, o-, m- or p-cresol, 2,6-, 2,5-, 2,4- or 3,5-dimethylphenol, 2-methyl-6-phenyl-phenol, 2,6-diethylphenol, 2-methyl-6-ethylphenol, and 2,3,5-, 2,3,6- or 2,4,6-trimethylphenol. These phenol compounds may be used in combination of two or more.

Furthermore, the ployphenylene ether may be copolymers of a phenol compound of the above formula and an other phenol compound, for example, dihydric phenols such as bisphenol A, tetrabromobisphenol A, resorcin and hydroquinone.

Any oxidation coupling catalyst may be used for oxidation polymerization of the phenol compound as far as it has polymerization ability. Examples thereof are catalysts comprising cuprous salt and tert. amine, such as cuprous chloride/trimethylamine, cuprous acetate/triethylamine and cuprous chloride/pyridine; catalysts comprising cupric salt, tert. amine and alkali metal hydroxide, such as cupric chloride/pyridine/potassium hydroxide; catalysts comprising manganese salt and primary amine, such as manganese chloride/ ethanolamine and manganese acetate/ethylenediamine; catalysts comprising manganese salt and alcoholate or phenolate, such as manganese chloride/sodium methylate and manganese chloride/sodium phenolate; and catalysts comprising cobalt salt and tert. amine.

The polyamide used in the present invention may be any of those which have

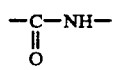

bond in polymer main chain and which can be molten by heating.

As typical examples thereof, mention may be made of 4-nylon, 6-nylon, 6,6-nylon, 12-nylon, 6,10-nylon, polyamide derived from terephthalic acid and trimethylhexamethylenediamine, polyamide derived from adipic acid and m-xylylenediamine, polyamide derived from adipic acid, azelaic acid and 2,2-bis(p-aminocyclohexyl)-propane, polyamide derived from terephthalic acid and 4,4'-diaminodicyclohexylmethane, polyamide derived from isophthalic acid, isophoronediamine and laurolactam, polyamide derived from isophthalic acid, 4,4'-diamino-3,3'-dimethyldicyclohexylenemethane and laurolactam and polyamide derived from isophthalic acid, terephthalic acids, hexamethylenediamine and 2,2-bis(p-aminocyclohexyl)-methane. These may be used alone or as a mixture or copolymer of two or more.

Suitable mixing ratio of polyphenylene ether and polyamide is polyphenylene ether: 5–95% by weight and polyamide: 95–5% by weight. If amount of polyamide is less than 5% by weight, improvement in solvent resistance is small and if amount of polyamide is more than 95% by weight, thermal properties such as heat distortion temperature tend to deteriorate.

The impact strength modifier (B) used in the present invention includes natural and synthetic rubber-like polymer materials which are elastic at room temperature, and various kinds of modified rubber-like polymer materials.

Examples of the rubber-like polymer material are natural rubber, butadiene polymer, butadiene-styrene copolymer (random copolymer, block copolymer and its hydrogenated block copolymer, etc.), styrene-butadiene-styrene block copolymer and its hydrogenated copolymer, isoprene polymer, isoprene-styrene copolymer (random copolymer, block copolymer and its hydrogenated block copolymer, etc.), chlorobutadiene polymer, butadiene-acrylonitrile copolymer, isobutylene polymer, isobutylene-butadiene copolymer, isobutylene-isoprene copolymer, acrylic ester copolymer, ethylene-propylene copolymer, ethylene-acrylic ester-maleic anhydride copolymer, ethylene-glycidyl methacrylate-vinyl acetate copolymer, ethylene-butene copolymer, ethylene-propylene-diene copolymer, ethylene-methacrylate-glycidyl methacrylate copolymer, Thiokol rubber, polysulfide rubber, polyurethane rubber, polyether rubber (e.g., polypropylene oxide, etc.), epichlorohydrin rubber, chloroprene rubber and polyamide elastomer.

These rubber-like polymer materials can be produced by various processes such as emulsion polymerization and solution polymerization and using various catalysts such as peroxides, trialkylaluminum, lithium halides and nickel-based catalysts.

Furthermore, the rubber-like polymer material may be one which has various crosslinking degree, various proportions of micro structures such as cis structure, trans structure and vinyl group, or various average rubber particle sizes.

Various kinds of copolymers such as random copolymers, block copolymers, and graft copolymers may be used as the rubber-like polymer material of the present invention.

Further, the rubber-like polymer material also includes rubber-like polymer materials which are modified by various methods. These modified rubber-like polymer materials include those which are prepared by modifying the above-mentioned rubber-like polymer materials with at least one compound selected from the group consisting of compound having in its molecule at least one group selected from carboxyl group, amino group, imino group, epoxy group, amide group, vinyl group, isocyanate group and hydroxyl group, or with at least one compound selected from the group of acid anhydrates, carboxylate esters and oxazoline rings. Examples are maleic anhydride modified ethylene-propylene copolymer, styrene modified ethylene-propylene copolymer, glycidyl methacrylate modified ethylene-propylene copolymer, and maleic anhydride modified styrene-butadiene copolymer (random copolymer, block copolymer and its hydrogenated block copolymer, etc.).

Modification of the rubber-like polymer material can be performed by introducing thereto at least one of the above-mentioned modifying compounds by any method. Generally, it is carried out by use of copolymerizations such as random copolymerization, block copolymerization and graft copolymerization to cause a reaction with main chain, side chain or terminal of molecule.

The amino resin (C) used in the present invention is one obtained by modifying with alcohol an addition reaction product of formaldehyde and at least one compound selected from melamine, guanamine and urea.

In more detail, the amino resin obtained by modifying melamine, guanamine and urea is represented by the following formula (I), (II) or (III).

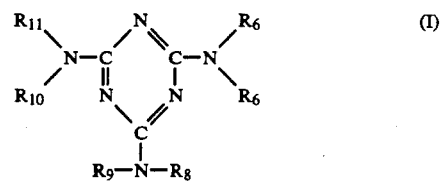

[wherein $R_6$, $R_7$, $R_8$, $R_9$, $R_{10}$ and $R_{11}$ each represents a hydrogen atom, an alkyl group, an aryl group or a substituent denoted by the formula (I'): $-(CH_2-O)-R_{12}$ (wherein $R_{12}$ represents a hydrogen atom or an alkyl or cycloaklyl group of 1–10 carbon atoms) and at least one of $R_6$–$R_{11}$ is a substituent denoted by the formula (I')].

Examples of the melamine derivatives represented by the formula (I) are alkoxymethylmelamine derivatives or cycloalkoxymethylmelamine derivatives which are obtained by modifying various methylolmelamines including from monomethylolmelamine to hexamethylolmelamine produced by condensation of melamine(2,4,6-triamino-1,3,5-triazine) and formaldehyde with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cycopentanol, n-hexyl alcohol, cyclohexanol, n-octyl alcohol, caprylic alcohol and n-decyl alcohol. Among them, preferred are those which are obtained by etherifying methylolated melamine with a lower alcohol such as methyl alcohol or butyl alcohol or those which are obtained by mixed-etherification with these two alcohols. Especially preferred are hexamethoxymethylmelamine and hexabutoxymethylmelamine obtained by modifying hexamethylolmelamine prepared by methylolating all of the amino groups attached to triazine nucleus of melamine, with methyl alcohol or n-butyl alcohol, in view of compatibility and reactivity with other resins and storage stability.

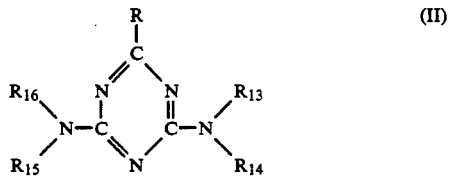

(II)

[wherein R represents a hydrogen atom, an alkyl group, an alkoxy group or an aryl group excluding amino group, $R_{13}$, $R_{14}$, $R_{15}$ and $R_{16}$ each represents a hydrogen atom, an alkyl group, an aryl group or a substituent represented by the above-mentioned formula (I') and at least one of $R_{13}$–$R_{16}$ is a substituent represented by the formula (I')].

Examples of the guanamine derivatives represented by the formula (II) are guanamine derivatives which are obtained by etherifying various methylolguanamines including from monomethylolguanamine to tetramethylolguanamine produced by condensation of guanamine(6-substituted-2,4-diaminotriazine-1,3,5) and formaldehyde with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among the guanamines, preferred is benzoguanamine(2,4-diamino-6-phenyltriazine-1,3,5).

Among the above etherified guanamine derivatives, preferred are methoxymethylguanamine derivatives and butoxymethylguanamine derivatives obtained by etherification with a lower alcohol such as methyl alcohol or butyl alcohol, and those which are obtained by mixed-etherification with these two alcohols. Especially preferred are tetramethoxymethylbenzoguanamine and tetrabutoxymethylbenzoguanamine obtained by modifying tetramethylolbenzoguanamine prepared by methylolating all of the amino groups attached to triazine nucleus of benzoguanamine, with methyl alcohol or n-butyl alcohol, in view of compatibility and reactivity with other resins and storage stability.

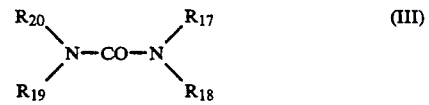

(III)

[wherein $R_{17}$, $R_{18}$, $R_{19}$ and $R_{20}$ each represents a hydrogen atom, an alkyl group, an aryl group or a substituent represented by the above-mentioned formula (I') and at least one of $R_{17}$–$R_{20}$ is a substituent represented by the formula (I')].

Examples of the urea derivatives represented by the formula (III) are urea derivatives which are obtained by etherifying various methylolureas including from monomethylolurea to tetramethylolurea produced by condensation of urea and formaldehyde with at least one of monohydric alcohols such as methyl alcohol, ethyl alcohol, n-propyl alcohol, isopropyl alcohol, allyl alcohol, crotyl alcohol, n-butyl alcohol, isobutyl alcohol, sec-butyl alcohol, t-butyl alcohol, n-amyl alcohol, isoamyl alcohol, t-amyl alcohol, neopentyl alcohol, cyclopentanol, n-hexyl alcohol, cyclohexanol, n-octyl alcohol, caprylic alcohol and n-decyl alcohol. Among them, preferred are those which are obtained by modification with a lower alcohol such as methyl alcohol or butyl alcohol and those which are obtained by mixed-etherification with these two alcohols. Especially preferred are tetramethoxymethylurea and tetrabutoxymethylurea obtained by modifying tetramethylolurea prepared by methylolating all of the amino groups of urea, with methyl alcohol or n-butyl alcohol, in view of compatibility and reactivity with other resins and storage stability.

These amino resins can be produced by various methods. For example, for producing methylated melamine, the following methods can be employed;

(1) a method which comprises allowing melamine to react with formalin under weak alkaline condition, liberating and drying the resulting methylolmelamine, etherifying the methylolmelamine in an alcohol under acidic condition and distilling off the reaction water together with alcohol, and (2) a method which comprises producing methylolmelamine in the same manner as in (1), partially dehydrating it in the reactor under reduced pressure, then adding an alcohol thereto to carry out reaction under acidic condition and removing the reaction water in the same manner as in (1).

Addition amount of amino resin (C) in the present invention is 0.01–10 parts by weight per 100 parts by weight of mixture of polyphenylene ether and polyamide. When it is 0.01 part by weight or less, the effect amied by the present invention tends to decreases, and when it is 10 parts by weight or more, softening point of the composition tends to decrease.

In order to improve compatibility of polyphenylene ether and polyamide with each other, the resin composition of the present invention may further contain a copolymer of styrene and α,β-unsaturated dicarboxylic acid anhydride (refer to, e.g., Japanese Patent Publication (Kokai) No. 61-204263), compounds which contain in molecule both a carbon-carbon double bond or a carbon-carbon triple bond and a carboxylic acid group, an acid anhydride group, an acid amide group, an imido group, a carboxylate ester group, an eposy group, an amino group or a hydroxyl group (refer to, e.g., Japanese Patent Publication (Kokoku) No. 60-11966) and epoxy group-containing compounds (refer to, e.g., Japanese Patent Publication (Kokai) No. 56-47432).

The resin composition of the present invention may also be used in the form of composite materials, preferably those reinforced with fibers such as glass fiber, carbon fiber, polyamide fiber and metallic whisker and those to which are added inorganic fillers such as silica, alumina, calcium carbonate, talc, mica, carbon black, $TiO_2$ ZnO and $Sb_2O_3$, flame-retardant aids, lubricants, nuclear agents, plasticizers, dyes, pigments, antistatic agents, antioxidants, and weatherability providing agents.

The method for producing the resin composition of the present invention is not limitative and any known methods can be used. A method in which the components are mixed in the form of solutions and solvents are evaporated or in which the said mixture is precipitated in a non-solvent, is effective. However, from the industrial viewpoint, a method of kneading them in molten state is employed in practice. The melt kneading is carried out using such a kneading machine as a generally-used single-screw or twin-screw extruder and various kneaders. The twin-screw extruder is especially preferred.

Before kneading, it is preferred to uniformly blend respective resin components in the form of powder or pellet by using such mixer as a tumbler or a Henschel mixer. However, each resin may be separately fed directly to a kneading machine through a metering device without the blending. The kneaded resin composition can be molded by injection molding, extrusion molding or various other molding processes. The present invention further includes a method in which molded articles are obtained by dry-blending the components firstly at the time of injection molding or extrusion molding and then directly kneading the components during its operation of melt processing, without the previous kneading.

There is no special limitation in sequence of kneading of the components. That is, polyamide, polyphenylene ether, impact strength modifier and amino resin may be kneaded at the same time or polyamide and polyphenylene ether are previously kneaded to obtain composition (A) and then impact strength modifier (B) and amino resin (C) may be kneaded with the composition (A). Other sequences of kneading may also be employed.

The following examples are merely illustrative of the present invention, and the present invention is not restricted to said examples. In the examples, deflection temperature under load (H.D.T.) and Izod impact strength (thickness: 3.2 mm) were measured according to JIS K7207 and JIS K7110, respectively.

Reference Example 1 (Preparation of amino resin (C)): C-1: 28.3 parts by weight of urea, 100 parts by weight of 37% neutral formalin and 60 parts by weight of n-butanol were mixed and heated from 25° C. to 94°-96° C. in 15-25 minutes. The mixture was kept at that temperature for 10-15 minutes and 0.07 part by weight of formic acid was added thereto. Then, the mixture was refluxed for 30-60 minutes under atmospheric pressure. The reaction system was cooled to 70°-75° C. while the pressure was reduced so that the reaction system was kept boiling and water was removed by azeotropy with butanol under a reduced pressure of 200-400 mmHg. Thereafter, temperature was gradually raised to 100°-105° C. to obtain polybutoxymethyl urea (C-1). An analysis showed that the number of butanol bonded was about 2 mol per 1 mol of urea.

C-2: A mixture of 378 parts by weight of melamine and 810 parts by weight of 37% formalin was adjusted to pH 7-8 with sodium hydroxide. The mixture was heated to about 70° C. and when it became transparent, 1800 parts by weight of methyl alcohol and 1.9 parts by weight of oxalic acid were added thereto. Then, the mixture was boiled for several minutes. The reaction mixture was cooled, then filtrated and concentrated under reduced pressure to obtain polymethoxymethyl melamine (C-2). An analysis showed that the number of methanol bonded was about 3 mol per 1 mol of melamine.

C-3: In the same manner as in C-2, polymethoxymethyl melamine (C-3) was prepared from 378 parts by weight of melamine, 1700 parts by weight of 37% formalin and 3600 parts by weight of methanol. An analysis showed that the number of methanol bonded was about 6 mol per 1 mol of melamine.

C-4: A mixture of 187 parts by weight of benzoguanamine and 268 parts by weight of 37% formalin was adjusted to pH 7-8 with sodium hydroxide. The mixture was heated to about 70° C. and when it became transparent, 600 parts by weight of methyl alcohol and 0.6 part by weight of oxalic acid were added thereto. Then, the mixture was boiled for several minutes. The reaction mixture was cooled, then filtrated and concentrated under reduced pressure to obtain polymethoxymethyl benzoguanamine (C-4). An analysis showed that the number of methanol bonded was about 3 mol per 1 mol of benzoguanamine.

EXAMPLES 1-11

Poly-(2,6-dimethyl-1,4-phenylene ether) (intrinsic viscosity measured in chloroform: 0.52 dl/g) was obtained by dissolving 2,6-dimethylphenol in toluene and methanol, adding thereto manganese chloride-ethylendiamine and oxidizing the mixture in an oxidizing atmosphere. To a mixture of this polyphenylene ether and nylon-6 (munfactured by Unitika Ltd.), were added the impact strength modifier as shown in Table 1 and the amino resin C-1, C-2, C-3 or C-4 obtained in Reference Example 1. The resultant mixture was kneaded at 250°-300° C. for 5 minutes. A batch-type small-sized twin-screw kneader (Laboplastmill ®) manufactured by Toyoseiki Co.) was used as a kneading machine. The results are also shown in Table 1.

COMPARATIVE EXAMPLES 1-3

Examples 5, 2 and 6 were repeated except that no amino resin (C) was added. The results are also shown in Table 1.

EXAMPLE 12

Example was repeated except that no impact strength modifier was added. The results are also shown in Table 1.

COMPARATIVE EXAMPLE 4

Example was repeated except that neither amino resin nor impact strength modifier was added. The results are also shown in Table 1.

TABLE 1

| | Polyphenylene ether/ nylon 6 (weight ratio) (A) | Impact strength modifier (B) Kind | Amount | Amino resin (C) Kind | Amount | Izod impact strength (notched) Kg · cm/cm | H.D.T. (°C.) |
|---|---|---|---|---|---|---|---|
| Example-1 | 7/3 | SBS[1] | 10 | C-1 | 1.0 | 11.5 | 147 |
| Example-2 | 6/4 | SEBS[2] | 10 | " | 1.0 | 15.5 | 128 |
| Example-3 | 3/7 | M-SEBS[3] | 10 | " | 1.0 | 13.7 | 101 |
| Example-4 | 5/5 | st-EPR[4] | 10 | C-2 | 0.7 | 26.8 | 121 |
| Example-5 | 6/4 | MEP/SEP | 5/5 | " | 0.7 | 24.5 | 135 |
| Example-6 | 6/4 | SBS | 10 | " | 0.7 | 15.0 | 138 |
| Example-7 | 6/4 | MEP[5] | 10 | C-3 | 0.6 | 27.4 | 142 |
| Example-8 | 4/6 | EMGMA[6] | 10 | " | 0.6 | 20.6 | 112 |
| Example-9 | 7/3 | SBS | 10 | C-4 | 0.8 | 18.5 | 150 |
| Example-10 | 6/4 | SEP[7] | 10 | " | 0.8 | 22.5 | 130 |
| Example-11 | 3/7 | GMA-EPR[8] | 10 | " | 0.8 | 19.6 | 105 |
| Comparative Example-1 | 6/4 | MEP/SEP | 5/5 | — | — | 3.9 | 112 |
| Comparative Example-2 | 6/4 | SEBS | 10 | — | — | 4.2 | 114 |
| Comparative Example-3 | 6/4 | SBS | 10 | — | — | 3.8 | 117 |
| Example-12 | 6/4 | — | — | C-3 | 0.7 | 7.3 | 148 |
| Comparative Example-4 | 6/4 | — | — | — | — | 2.6 | 140 |

[1] Styrene-butadiene-styrene block copolymer
[2] Hydrogenated styrene-butadiene-styrene block copolymer (styrene-ethylene-butylene-styrene block copolymer)
[3] Maleic anhydride modified hydrogenated styrene-butadiene-styrene block copolymer
[4] Styrene modified ethylene-propylene copolymer
[5] Maleic anhydride modified ethylene-propylene copolymer
[6] Ethylene-methacrylate-glycidyl methacrylate copolymer
[7] Hydrogenated styrene-isoprene block copolymer
[8] Glycidyl methacrylate modified ethylene-propylene copolymer The present invention provides a composition improved in compatibility and stability between polyamide and polyphenylene ether, and which is excellent in processability and impact strength. Thus, the present composition has a wide variety of uses.

This novel composition can be easily processed into shaped articles, sheets, films and the like by ordinary methods employed for thermoplastic resins such as injection molding and extrusion molding. These products are excellent in impact strength, heat resistance and processability. This composition is especially effective for injection molding.

We claim:

1. A thermoplastic resin composition which comprises:

(A) 100 parts by weight of a composition comprising 95–5% by weight of a polyphenylene ether obtained by oxidation polymerization of at least one phenol compound represented by the following formula:

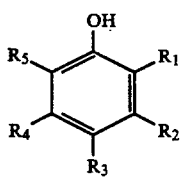

(wherein $R_1$, $R_2$, $R_3$, $R_4$ and $R_5$ which may be identical or different, each represents a hydrogen atom, a halogen atom, a hydrocarbon radical or a substituted hydrocarbon radical and at least one of them is a hydrogen atom) and 5–95% by weight of a polyamide, and (C) 0.01–10 parts by weight of an amino resin obtained by modifying with an alcohol an addition reaction product of formaldehyde and at least one compound selected from the group consisting of melamine, guanamine and urea.

2. A thermoplastic resin composition according to claim 1, wherein the amino resin (C) is represented by the following formula (I), (II) or (III):

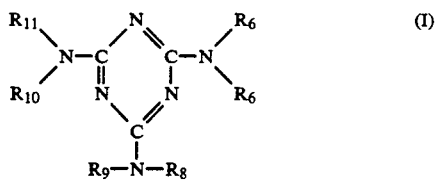

wherein $R_6$, $R_7$, $R_8$, $R_9$, $R_{10}$ and $R_{11}$ each represents a hydrogen atom, an alkyl group, an aryl group or a substituent denoted by the formula (1'): $-(CH_2-O)-R_{12}$ wherein $R_{12}$ represents a hydrogen atom or an alkyl or cycloalkyl group of 1–10 carbon atoms, and at least one of $R_6$–$R_{11}$ is a substituent denoted by the formula (1'),

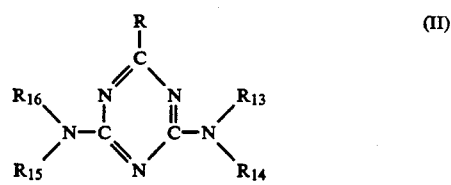

wherein R represents a hydrogen atom, an alkyl group, an alkoxy group or an aryl group excluding amino group, $R_{13}$, $R_{14}$, $R_{15}$ and $R_{16}$ each represents a hydrogen atom, an alkyl group, an aryl group or a substituent represented by the above-mentioned formula (I') and at least one of $R_{13}$–$R_{16}$ is a substituent represented by the formula (I'), and

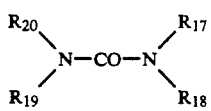

(III)

wherein $R_{17}$, $R_{18}$, $R_{19}$ and $R_{20}$ each represents a hydrogen atom, an alkyl group, an aryl group or a substituent represented by the above-mentioned formula (I′) and at least one of $R_{17}$–$R_{20}$ is a substituent represented by the formula (I′).

* * * * *

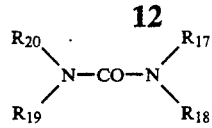

(III)

wherein $R_{17}$, $R_{18}$, $R_{19}$ and $R_{20}$ each represents a hydrogen atom, an alkyl group, an aryl group or a substituent represented by the above-mentioned formula (I′) and at least one of $R_{17}$–$R_{20}$ is a substituent represented by the formula (I′).

* * * * *